United States Patent [19]

Santowski et al.

[11] Patent Number: 4,988,649
[45] Date of Patent: Jan. 29, 1991

[54] SILICA BRICKS AND PROCESS FOR PRODUCTION THEREOF

[75] Inventors: Klaus Santowski, Pleitersheim; Hermann Leupold, Walluf; Alois Angeler, Bonn, all of Fed. Rep. of Germany

[73] Assignee: Didier-Werke AG, Wiesbaden, Fed. Rep. of Germany

[21] Appl. No.: 437,440

[22] Filed: Nov. 16, 1989

[30] Foreign Application Priority Data

Mar. 13, 1989 [DE] Fed. Rep. of Germany ....... 3908124

[51] Int. Cl.$^5$ ............................................. C04B 35/14
[52] U.S. Cl. ..................................... 501/133; 501/154
[58] Field of Search ................................ 501/133, 154

[56] References Cited

U.S. PATENT DOCUMENTS 3,144,345 8/1964 McCreight et al. ................ 501/133
3,620,783 11/1971 Mahler et al. ....................... 501/133
4,183,761 1/1980 Hoshino et al. ..................... 501/133

Primary Examiner—William R. Dixon, Jr.
Assistant Examiner—Deborah Jones
Attorney, Agent, or Firm—Wenderoth, Lind & Ponack

[57] ABSTRACT

A process for making silica bricks with increased bulk density from a starting mix containing graded granular quartzite (silica) and elemental silicon, wherein the starting mix contains 0.5 to 10 weight percent of the elemental silicon and also contains 1.5 to 8 weight percent of pyrogenic silicon dioxide based on the weight of the quartzite, elemental silicon and pyrogenic silicon dioxide in the starting mix.

8 Claims, No Drawings

SILICA BRICKS AND PROCESS FOR PRODUCTION THEREOF

BACKGROUND OF THE INVENTION

The present invention relates to a process for making silica bricks with high bulk density from a starting mix with graded granular quartzite (silica) and elemental silicon, and to the bricks obtained by this process.

Such silica bricks, which are also known as silicon dioxide bricks, are used in blast furnaces, hot-blast stoves and especially coke ovens, and an attempt has been made to achieve a bulk density as high as possible of such silica bricks so as to improve their thermal conductivity.

West German Patent No. 2,836,691 describes a process for making such silica bricks with high bulk density, and in this case 0.5 to 10 weight percent of silicon nitride and/or silicon carbide is added to the starting mix which is then treated in a temperature range between 1200 and 1400° C. under very special conditions relating to the oxygen concentration below the gas outlet opening in the firing kiln and the rate of temperature rise in ° C./hr. This West German Patent No. 2,836,691 also indicates, as a teaching of the prior art, that silica bricks can also be made with admixture of metal oxides, such as $Cu_2O$, $TiO_2$ and $Fe_2O_3$ or by addition of silicon carbide.

In order to obtain silica bricks with low porosity, and hence with improved corrosion resistance, the use of elemental silicon or silicon carbide together with an ammonium compound or especially a nonvolatile oxidizing compound, such as calcium or magnesium nitrate, is known in the art of making silica bricks (British Patent Nos. 880,582 and 1,012,363). The use of water-soluble compounds for preparing the mix is disadvantageous, however, and difficulties occur during the firing of the bricks. There is also the risk of additional environmental pollution because of the use of salt-like compounds.

U.S. Pat. No. 3,144,345 discloses a process for making silica bricks with high density and high thermal conductivity, in which finely divided amorphous silicic acid (condensed from the vapor phase) is employed in the mix. The resulting silica bricks attain a density of up to 1.84 g/cm³ (115 lb/ft³), as apparent from column 4, Table I, Example 4.

SUMMARY OF THE INVENTION

The object of the present invention is to provide a process that makes it possible, in an economical and technically simple manner, to make silica bricks with high bulk density, i.e. dense silica bricks, especially for coke ovens, with high thermal conductivity and without using salts that pollute the environment.

This object is achieved by a process wherein the starting mix contains 0.5 to 10 weight percent of elemental (metallic) silicon in particle sizes up to 75 microns and 1.5 to 8 weight percent of finely divided, amorphous, pyrogenic silicon dioxide, based on the weight of the quartzite, silicon and pyrogenic silicon dioxide components in the starting mix.

DETAILED DESCRIPTION OF THE INVENTION

More specifically, the present invention provides a silica brick having a bulk density of equal to or greater than 1.86 g/cm³, an open porosity of less than 20 volume percent, and thermal conductivity of the following mean values:

at 400° C. : 2.1 W/mk at 700° C. : 2.3 W/mk at 1000° C. : 2.6 W/mk at 1200° C. : 3.0 W/mk.

The present invention also provides, in a process for producing silica bricks, which comprises providing a mixture containing quartzite and elemental silicon, shaping the mixture into bricks and firing the bricks, the improvement wherein the mixture contains 0.5 to 10 weight percent of elemental silicon in a particle size up to 75 microns and 1.5 to 8 weight percent of finely divided, amorphous, pyrogenic silicon dioxide based on the total weight of the quartzite, elemental silicon and pyrogenic silicon dioxide.

Preferably, the starting mix contains 3 to 6 weight percent of elemental silicon and 1.5 to 5 weight percent of pyrogenic silicon dioxide.

The finely divided amorphous pyrogenic silicon dioxide unexpectedly promotes the formation of new $SiO_2$ from the elemental silicon by extensive oxidation and the accretion of the newly formed $SiO_2$. It is assumed that, at high temperatures during firing, the elemental silicon that has not yet been converted into $SiO_2$ forms small molten drops that accumulate nonhomogeneously in the form of clusters in the matrix of the brick microstructure. The formation of such accumulations of molten drops of elemental silicon is prevented by means of the pyrogenic silicon dioxide. The pyrogenic silicon dioxide preferably has a primary particle size of up to 3 microns and a high surface activity, and existing pore spaces, especially micropores in the silica brick, are advantageously filled by the pyrogenic silicon dioxide.

In the process according to the invention, difficulties in pressing and firing the bricks arise if the contents of elemental silicon and pyrogenic silicon dioxide exceed the upper limits. In particular, if the content of elemental silicon during firing is too high, bricks are obtained which contain warps and cracks. With contents of elemental silicon and pyrogenic silicon dioxide below the stated lower limits, a marked improvement of the bulk density of the silica bricks is not achieved.

The invention also relates to silicon dioxide bricks which are made according to the process described hereinabove, and which have a high bulk density of $R \geq 1.86$ g/cm³ and a thermal conductivity, measured in accordance with DIN 51046, of the following mean values:

at 400° C. : 2.1 W/mk at 700° C. : 2.3 W/mk at 1000° C. : 2.6 W/mk at 1200° C. : 3.0 W/mk.

In the process according to the invention, the quartzites, such as cement quartzites and rock quartzites, which are suitable for making refractory silica bricks, are used as starting material in a manner known in itself. As an example, a cement quartzite (West German deposit at Merzhausen) is mentioned, which, according to chemical analysis contains 0.70 weight percent of Al- $_2O_3$, 0.85 weight percent of $TiO_2$, 0.15 weight percent of $Fe_2O_3$ and around 98.0 weight percent of $SiO_2$.

When firing the silica bricks, the quartz phase of the starting materials is converted largely into cristobalite and tridymite. The fired silica bricks, especially as high-grade qualities for use in walls of coke ovens, have extensive conversion of the silicon dioxide phases and a residual quartz content amounting to only a few percent. The corresponding density of the silica brick is in the range of 2.33 to 2.34 g/cm$^3$. Values of 1.86 g/cm$^3$ and more are obtained for the bulk density, and the open porosity is less than 20 volume percent.

Firing in the process according to the invention can be performed in a normal manner, i.e. at final temperatures of 1400° to 1450° C. In the temperature range above 1000° C., the firing time should advantageously lie between 100 and 300 hours and the oxygen content of the kiln atmosphere surrounding the material to be fired should advantageously be between 5 and 14 volume percent in this temperature range above 1000° C., in order for the most complete oxidation of the elemental silicon to silicon dioxide to be achieved. The residues of elemental silicon remaining in the silicon dioxide brick after firing are small. No disadvantageous behavior of the bricks occurs, such as, for example, subsequent growth of the bricks, due to the residual silicon and its conversion into silicon dioxide during the use of the bricks.

The elemental silicon employed in the process of the invention must have a particle size of 75 microns at most, and preferably 44 microns at most. Such finely divided elemental silicon is commercially available.

The preparation of the starting mix is carried out in a manner known in itself, except that 0.5 to 10 weight percent of elemental silicon of the aforementioned maximum particle size and 1.5 to 8 weight percent of pyrogenic silicon dioxide with a primary particle size of 3 microns at most are added to the silicon dioxide starting material or to the silicon dioxide starting materials, which are present in a classification normal for making silica bricks. After thorough blending and shaping, the resulting bricks are then fired.

The finely divided silicon dioxide with a primary particle size of up to 3 microns employed in the preferred embodiment of the process is a commercially available product and is produced as so-called fly ash, i.e. a by-product, for example, when producing ferrosilicon or of zirconium dioxide from zircon sand, $ZrSiO_4$. This product is also known as pyrogenic silicic acid, and it consists of agglomerates in which the primary particle size is 3 microns at most.

The invention will now be explained in more detail with reference to Examples 1 to 4 and Comparison Examples A, B and C hereinbelow. The data for the examples and the properties of the silica bricks are enumerated in the table.

EXAMPLE 1

A starting mix was prepared from 88 weight percent of quartzite with a particle size of 0 to 3 mm, 10 weight percent of silicon with a particle size of 44 microns at most, and 2 weight percent of the commercially available pyrogenic silicon dioxide (silicic acid). As additive the starting mix contained 2 weight percent of limestone flour, 3 weight percent of lime milk and 1 weight percent of organic binder. Silica bricks of normal dimensions for coke ovens were made and fired at a maximum firing temperature of 1440° C. under standard firing conditions for silica bricks, the residence time at temperatures above 1000° C. being approximately 150 hr. The silica bricks had a high degree of conversion (density 2.33 g/cm$^3$ and 0.5% residual quartz) and at the same time a high weight per unit volume, and the residual content of elemental silicon was approximately 1.2 weight percent.

EXAMPLES 2 to 4

The procedure of Example 1 was repeated, but with different amounts of components. The table shows that, compared with Example 1, which has the highest content of elemental silicon in the starting mix, Example 2 has a lower residual content of silicon in the fired brick, with otherwise approximately equal properties. Examples 3 and 4 represent preferred ranges of the process according to the invention. Silica bricks with high bulk density and low values for the properties of porosity, gas permeability and residual silicon are obtained.

COMPARISON EXAMPLES A, B AND C

The procedure of Example 1 was repeated, except that in Comparison Example A neither elemental silicon nor pyrogenic silicon dioxide (silicic acid) were used in the starting mix. The resulting silica bricks had a low bulk density and high porosity. Comparison Examples B and C have elemental silicon in the starting mix, with the result that silica bricks were obtained which, while having a somewhat higher bulk density than Comparison Example A, also had a high content of residual silicon, i.e. 1.6 weight percent or more.

When compared with Comparison Examples A, B and C., it is apparent that Examples 1 to 4 according to the present invention provide silica bricks which are distinguished by advantageous properties, such as high bulk density, low porosity, low gas permeability and a low residual content of elemental silicon.

TABLE

| Examples or Comparison Examples: | 1 | 2 | 3 | 4 | A | B | C |
|---|---|---|---|---|---|---|---|
| Quartzite (0 to 3 mm) | 88 | 90 | 93 | 90 | 100 | 95 | 90 |
| Elemental silicon ($\leq$44 microns) | 10 | 8 | 5 | 5 | — | 5 | 10 |
| Pyrogenic silicic acid ($\leq$3 microns) | 2 | 2 | 2 | 5 | — | — | — |
| Limestone flour | 2 | 2 | 2 | 2 | 2 | 2 | 2 |
| Lime milk | 3 | 3 | 3 | 3 | 3 | 3 | 3 |
| Organic binder | 1 | 1 | 1 | 1 | 1 | 1 | 1 |
| Properties: | | | | | | | |
| Bulk density, R (g/cm$^3$) | 1.87 | 1.87 | 1.96 | 1.91 | 1.83 | 1.85 | 1.86 |
| Open porosity, $P_o$ (volume percent) | 18.0 | 18.8 | 14.3 | 16.5 | 21.0 | 20.0 | 18.5 |
| Gas permeability (Nperm) | 7.5 | 8.0 | 2.2 | 3.1 | 11.0 | 10.5 | 8.5 |
| Density (g/cm$^3$) | 2.33 | 2.33 | 2.33 | 2.33 | 2.33 | 2.33 | 2.33 |
| Cold compressive strength (N/mm$^2$) | 47 | 50 | 82 | 61 | 40 | 45 | 46 |
| Residual quartz (weight percent) | 0.5 | 0.5 | 0.5 | 0.5 | 0.5 | 1.0 | 1.0 |

TABLE-continued

| (Quantitative data in weight percent) | | | | | | | |
|---|---|---|---|---|---|---|---|
| Examples or Comparison Examples: | 1 | 2 | 3 | 4 | A | B | C |
| Residual silicon (weight percent) | 1.2 | 1.0 | 0.25 | 0.53 | — | 1.6 | 2.12 |

We claim:

1. A process for producing silica bricks having a bulk density equal to or greater than 1.86 g/cm$^3$, an open porosity of less than 20 volume percent, and thermal conductivity of the following mean values:

at 400° C. : 2.2 W/mk at 700° C. : 2.3 W/mk at 1000° C. : 2.6 W/mk at 1200° C. : 3.0 W/mk which comprises providing a mixture containing quartzite and elemental silicon, shaping said mixture into bricks and firing said bricks, the improvement wherein said mixture contains 0.5 to 10 weight percent of elemental silicon in a particle size up to 75 microns and 1.5 to 8 percent of finely divided, amorphous, pyrogenic silicon dioxide based on the total weight of said quartzite, elemental silicon and pyrogenic silicon dioxide.

2. The process according to claim 1, wherein said pyrogenic silicon dioxide has a primary particle size of up to 3 microns.

3. The process according to claim 2, wherein said mixture contains 3 to 6 weight percent of said elemental silicon and 1.5 to 5 weight percent of said pyrogenic silicon dioxide.

4. The process according to claim 2, wherein said elemental silicon has a particle size up to 44 microns.

5. A silica brick produced according to the process of claim 1.

6. A silica brick produced according to the process of claim 2.

7. A silica brick produced according to the process of claim 3.

8. A silica brick produced according to the process of claim 4.

* * * * *